(12) United States Patent
Kao

(10) Patent No.: US 6,424,435 B1
(45) Date of Patent: Jul. 23, 2002

(54) MODULARIZED CARRIAGE HAVING SHOCK ABSORBER STRUTS FOR A CONTACT IMAGE SENSOR MODULE

(75) Inventor: Will Kao, Hsinchu (TW)

(73) Assignee: Mustek Systems, Inc., Hsinchu (TW)

( * ) Notice: Subject to any disclaimer, the term of this patent is extended or adjusted under 35 U.S.C. 154(b) by 0 days.

(21) Appl. No.: 09/293,335

(22) Filed: Apr. 16, 1999

(51) Int. Cl.⁷ ................................................. H04N 1/04
(52) U.S. Cl. ....................................... 358/497; 358/483
(58) Field of Search .............................. 358/497, 483, 358/474, 471, 496, 505, 494, 482; 250/208.1, 239; 399/211

(56) References Cited

U.S. PATENT DOCUMENTS

| | | | | |
|---|---|---|---|---|
| 5,517,332 A | * | 5/1996 | Barry et al. | 358/496 |
| 5,734,483 A | * | 3/1998 | Itoh | 358/496 |
| 5,805,307 A | * | 9/1998 | Park | 358/471 |
| 5,878,319 A | * | 3/1999 | Itoh | 399/367 |
| 5,982,512 A | * | 11/1999 | Kim | 358/498 |
| 5,999,277 A | * | 12/1999 | Tsai | 358/498 |
| 6,008,485 A | * | 12/1999 | Chiang | 250/208.1 |
| 6,091,516 A | * | 7/2000 | Chang et al. | 358/474 |
| 6,137,106 A | * | 10/2000 | Kao | 250/239 |
| 6,178,013 B1 | * | 1/2001 | Lin | 358/474 |

* cited by examiner

*Primary Examiner*—Cheukfan Lee

(57) ABSTRACT

A modularized carriage having a plurality of shock absorber struts is provided to allow a contact type image sensor module (CIS module) to contact tightly with the bottom surface side of the sheet table. The carriage has a plurality of holes formed on its bottom side. The bottom ends of the shock absorber struts are fixed to the bottom of the carriage. The shock absorber struts pass through the holes for supporting the CIS module in a manner such that the CIS module can contact tightly with the bottom surface side of the sheet table. Thus, while the CIS module is driven along the sheet table, the inventive carriage can absorb the vertical vibration of the CIS module and allow a document to stay within the scene depth of the CIS module. Since the present invention is a modularized carriage which is adaptable for various types of CIS modules and transmission mechanisms, the present invention can simplify the assembly and readjustment procedures of a CIS scanner. Moreover, the modularized carriage also helps to simplify the inner structure of the CIS scanner and reduces the size of the CIS scanner.

8 Claims, 4 Drawing Sheets

MODULARIZED CARRIAGE HAVING SHOCK ABSORBER STRUTS FOR A CONTACT IMAGE SENSOR MODULE

BACKGROUND OF THE INVENTION

A. Field of the Invention

The present invention relates to a modularized carriage for a contact image sensor module (hereinafter referred to as the CIS module), especially to a modularized carriage having shock absorber struts for allowing a CIS module to contact tightly with the bottom surface side of a sheet table. The modularized carriage can simplify the assembly and adjustment of the CIS scanner and improve the image quality of images.

B. Description of the Prior Art

The scene depth of a conventional contact image sensor is only about 0.3 mm. Any manufacturing error or structure distortion will easily shift the document sheet away from the focus. Referring to FIG. 1, to keep the document sheet positioned within such a short scene depth, the conventional carriage 2 contains an internal spring 4 at the bottom of the carriage. The function of the internal spring 4 is to lift the contact image sensor module 1 up to contact the bottom surface side of the sheet table 6. A contact image sensor module 1 is loaded in a fitting carriage 2. When the carriage 2 is supported by a guiding device 3, the CIS module 1 can tightly contact the bottom surface side of the sheet table 6 with sliding blocks 5a, 5b interposed therebetween while being driven by the guiding device 3. With the spring 4, the CIS module 1 can tightly contact the bottom surface side of the sheet table 6 to keep the document sheet in focus even if the housing is distorted. However, for convenience of assembly, the conventional structure as illustrated in FIG. 1 still has a few drawbacks. For instance, the spring 4 must be located precisely and firmly at the bottom center of the carriage 2. In addition, the guiding device 3 must be carefully installed to keep the carriage 2 in balance. It would be desirable to simplify the structure of the conventional CIS module and make assembly easier.

SUMMARY OF THE INVENTION

The primary object of the present invention is to provide a modularized carriage having shock absorber struts for controlling a document staying within the scene depth of the CIS module, thereby to improve the picture quality of the images.

It is another object of the present invention to provide a modularized carriage having shock absorber struts which is adaptable for various types of CIS modules, thereby simplifying the assembly and readjustment procedures of the CIS scanner.

It is yet another object of the present invention to provide a modularized carriage which is easily adaptable for various driving and guiding structures of flatbed scanners, thereby simplifying assembly procedure and further reducing the maintenance fees and manufacturing costs.

In accordance with the invention, a modularized carriage having a plurality of shock absorber struts is provided for allowing the CIS module to tightly contact the bottom surface side of the sheet table. The carriage has a plurality of holes formed on its bottom side for the shock absorber struts. The bottom ends of the shock absorber struts are fixed to the bottom of the carriage. The shock absorber struts pass through the holes for supporting the CIS module in a manner that the CIS module can tightly contact the bottom surface side of the sheet table. Thus, the document can be controlled to stay within the scene depth of the CIS module. Since the present invention is a modularized carriage which is adaptable for various types of CIS modules and transmission mechanisms, the present invention can make the assembly procedure more convenient. The modularized carriage also helps to simplify the inner structure of the CIS scanner and reduces the size of the CIS scanner.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

Figure 1:
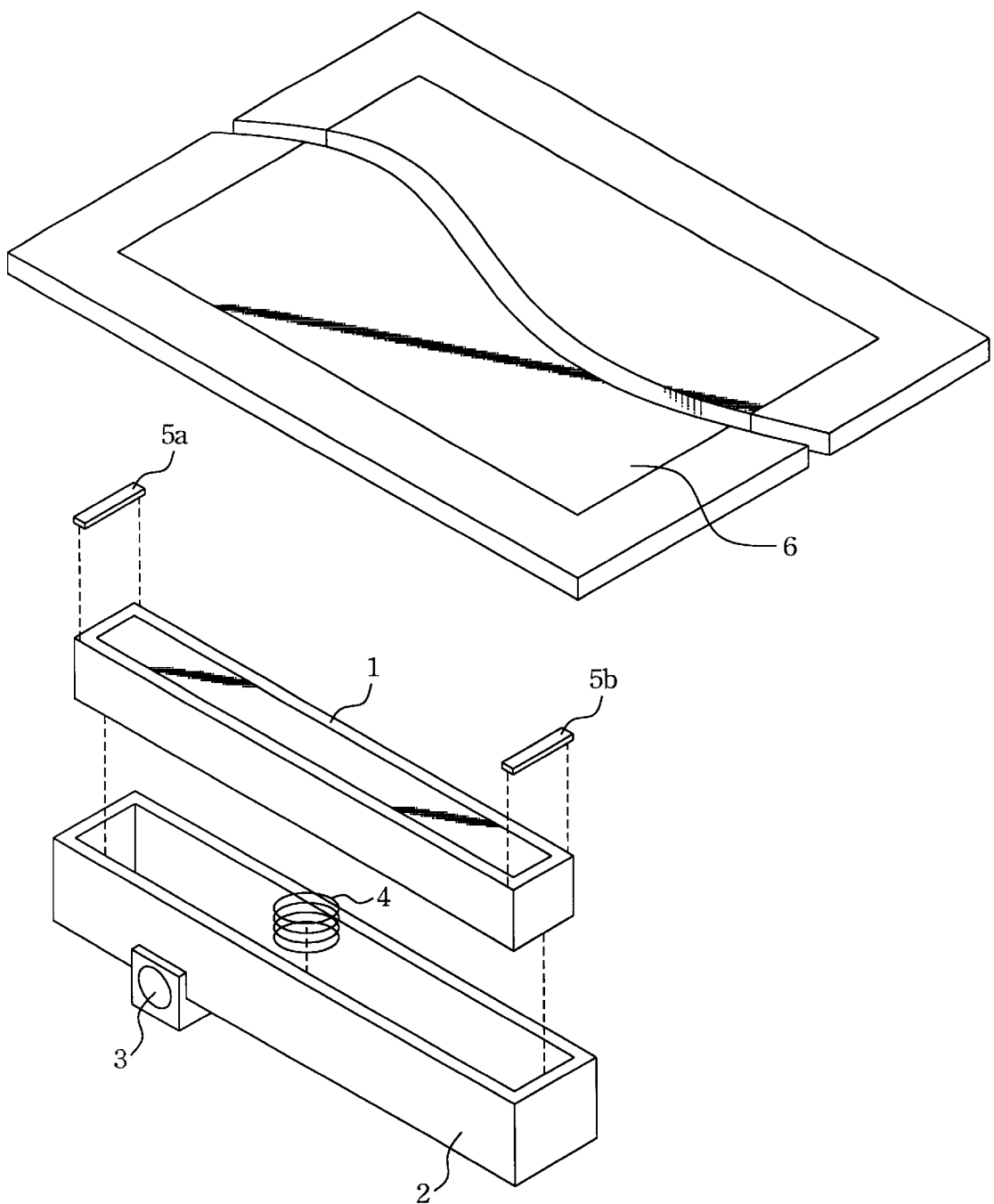
FIG. 1 is an explosive view schematically showing the structure of a conventional CIS module and carriage.
Figure 2A:
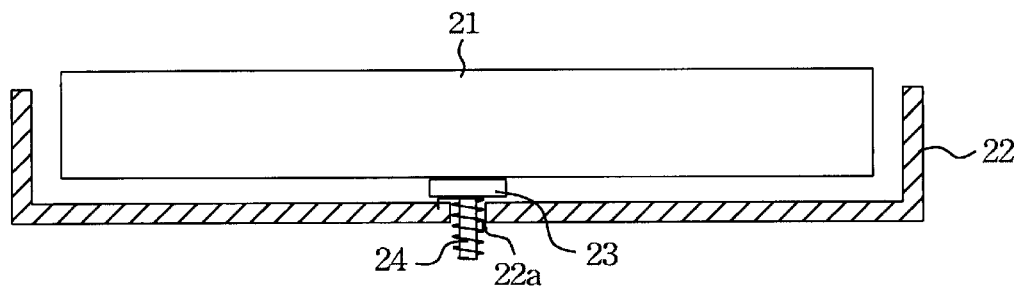
FIG. 2A is a sectional side view schematically showing the structure of carriage having shock absorber strut and a CIS module according to a preferred embodiment of the present invention.
Figure 2B:
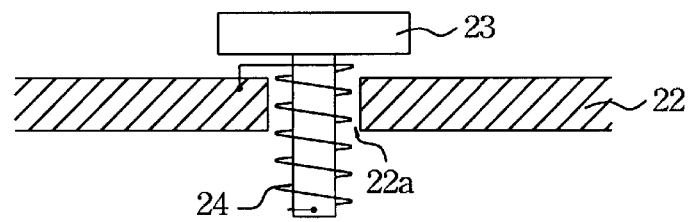
FIG. 2B is an enlarged view partially showing the structure of the shock absorber struts and the carriage.
Figure 5:
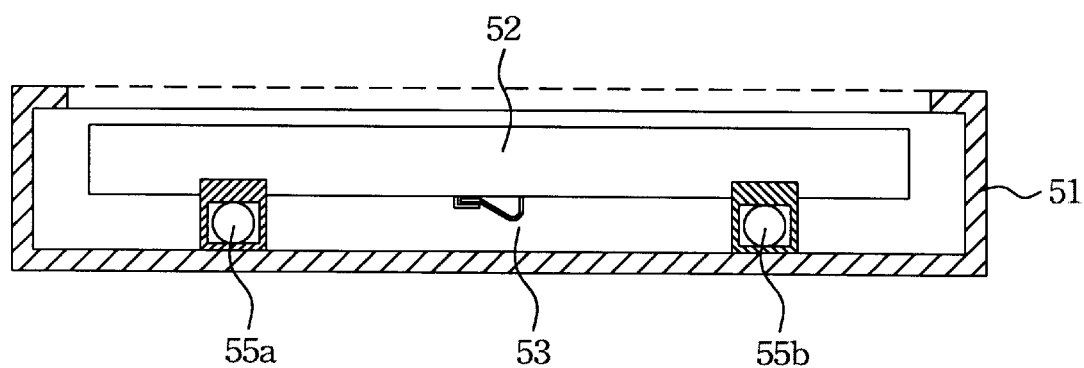
FIG. 5 is a perspective side view showing the inventive carriage applied to a flatbed scanner of two parallel guiding devices.

Accordingly, the preferred embodiment of the present invention is illustrated in FIG. 2A. The carriage 22 has a hole 22a formed in the bottom side for allowing a T-shaped strut 23 to pass through the hole 22a and lift the CIS module 21a up to tightly contact the bottom surface side of a sheet table (not shown). The top end of the T-shaped strut 23 is flat for increasing the contact area between the CIS module 21 and the T-shaped strut 23 so as to keep the CIS module 21 in balance. The T-shaped strut 23 is circumscribed by a spring 24. One end of the spring 24 is fixed at the bottom of the carriage 22 in a manner as shown in FIG. 2B. The other end of the spring 24 is fixed at the bottom end of the T-shaped strut 23. Consequently, when the CIS module 21 is loaded into the carriage 22, the T-shaped strut 23 with the elasticity of the spring will support the CIS module 21 to tightly contact the bottom surface side of the sheet table while being driven along the sheet table. Once the housing or the transmission mechanism of the scanner is distorted, the spring 24 on the T-shaped strut 23 can help to absorb the vertical vibration of the CIS module 21, and allow the document to stay within the scene depth of the CIS module 21. The embodiment as illustrated in FIG. 2A is adaptable for a pair of parallel guiding devices as illustrated in FIG. 5.

Figure 2C:
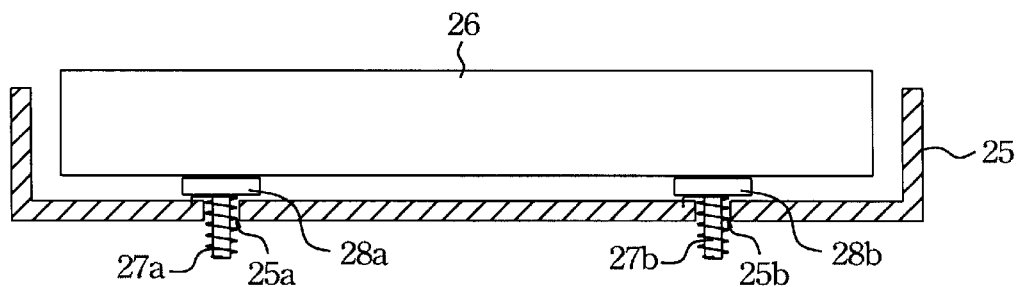
FIG. 2C is a sectional side view schematically showing the structure of the carriage having shock absorber struts and a CIS module according to another preferred embodiment of the present invention.
Figure 4:
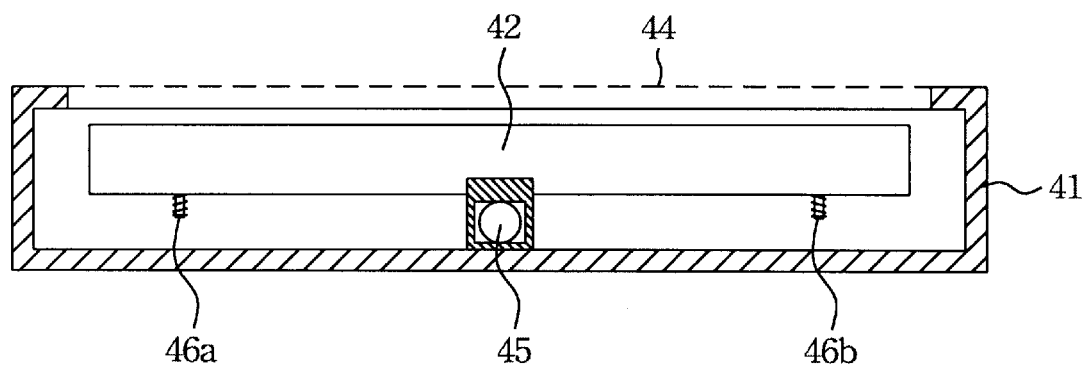
FIG. 4 is a perspective side view showing the inventive carriage applied to a flatbed scanner of a single guiding device.

In application, the embodiment as illustrated in FIG. 2A can be modified as a carriage having double shock absorber struts as illustrated in FIG. 2C. The carriage 25 has two holes 25a, 25b formed in the bottom side, one on the right side and the other on the left side. The T-shaped struts 28a, 28b pass through the holes 25a, 25b to support the CIS module 26 from the bottom of the carriage 25. In contrast to the embodiment of FIG. 2A, the carriage 25 with double shock absorber struts is adaptable for a single guiding device as illustrated in FIG. 4.

Figure 3A:
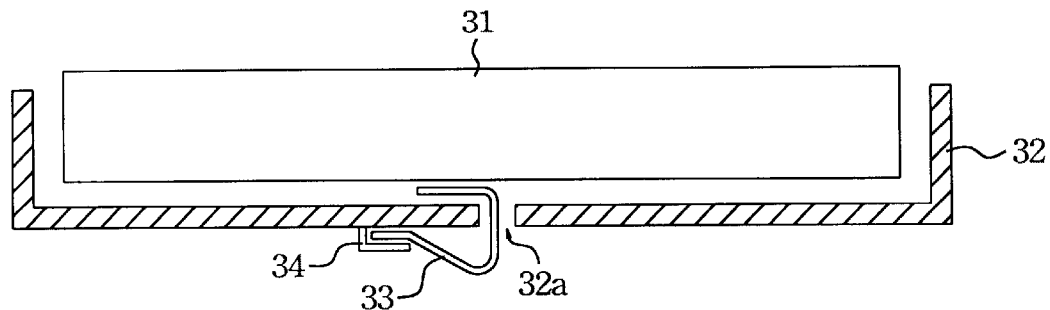
FIG. 3A is a sectional side view schematically showing the structure of a carriage having a shock absorber strut and a CIS module according to another preferred embodiment of the present invention.
Figure 3B:
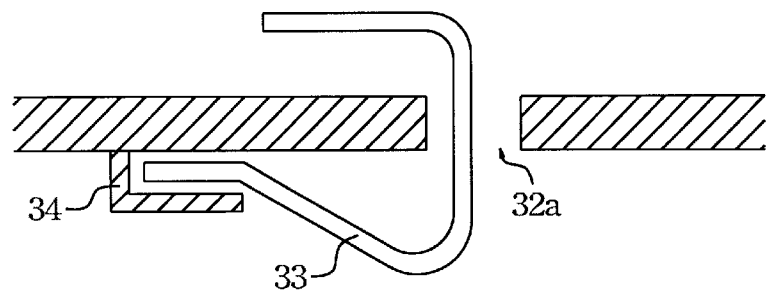
FIG. 3B is an enlarged view partially showing the structure of the shock absorber strut and the carriage according to another preferred embodiment of the present invention.

The second preferred embodiment of the present invention is illustrated in FIG. 3A. The carriage 32 also has a hole 32a formed in the bottom of the carriage 32 for allowing a shock absorber strut 33 to pass through and lift the CIS module 31 up to contact tightly with the bottom surface side of the sheet table. The shock absorber strut 33 is made of spring steel which is also flat on the top for increasing the supporting area for the CIS module 31. The lower end of the shock absorber strut 33 is inserted into the slot 34 at the bottom of the carriage 32. The relative positions and structure of the carriage 32 and the shock absorber strut 33 can be illustrated more clearly from the enlarged view as shown in FIG. 3B. The function of the shock absorber strut 33 is the same as the T-shaped strut 23 as illustrated in FIG. 2A. When the CIS module 31 is loaded into the carriage 32, the shock absorber strut 33 can absorb the vertical vibration of the CIS module 31 and allow the CIS module 31 to tightly contact the bottom surface side of the sheet table. The carriage 32 with the single shock absorber strut 33 is adaptable for a pair of parallel guiding devices, as shown in FIG. 5.

Figure 3C:
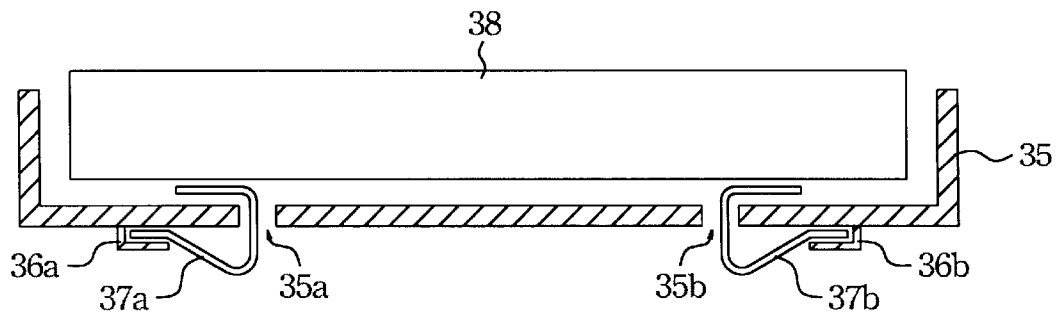
FIG. 3C is a sectional side view schematically showing the structure of a carriage having two shock absorber struts and a CIS module according to another preferred embodiment of the present invention.

The embodiment as shown in FIG. 3A can be modified as a carriage having double shock absorber struts as illustrated in FIG. 3C. The carriage 35 has two holes 35a, 35b formed in the bottom, one on the right side and the other on the left side. The carriage 35 with double shock absorber struts is adaptable for a flatbed scanner having a single guiding device as illustrated in FIG. 4.

The simplicity of the structure of the preferred embodiment of the invention allows a contact image sensor module to be adaptable for various driving and guiding structures. For example, FIG. 4 shows the preferred embodiment of the present invention when adapting to a flatbed scanner with a single guiding device. On top of the housing 41, there is a sheet table 44 for placing a document sheet. A carriage 42 containing a contact image sensor is located beneath the sheet table 33 and is supported by a single guiding device 45. The single guiding device 45 may be a guiding shaft or a sliding shaft cross over the bottom center of the carriage 42 for supporting the carriage 42 to contact the bottom surface side of the sheet table 44. When the carriage 44 is driven along the guiding device 45, the shock absorber struts 46a, 46b help to reduce the vertical vibration of the contact image sensor. The driving device (not shown) can be implemented on one side of the guiding device 45 to pull the carriage 42 from one end of the sheet table 44 to the other end of the sheet table 44 to progressively finish reading the image of the document.

The preferred embodiment of the present invention is also adaptable for a flatbed scanner with a pair of guiding devices, as illustrated in FIG. 5. A pair of parallel guiding devices 55a, 55b is located beneath the carriage 52. The carriage with single shock absorber strut 52 can absorb the shock of the CIS module in the carriage 52. The driving device (not shown) can be implemented on one side of a guiding device 55a or 55b.

In summary, the modularized carriage of the present invention can be adapted to various driving and guiding devices, including a single guiding device, or a pair of parallel guiding devices. The modularized carriage of the present invention can guarantee the document stay within the scene depth of the contact image sensor as long as the guiding devices can lift the carriage up in balance and allow the contact image sensor to tightly contact the bottom surface side of the sheet table.

It should be understood that various alternatives to the structures described herein might be employed in practicing the present invention. It is intended that the following claims define the invention and that the structure within the scope of these claims and their equivalents be covered thereby.

What is claimed is:

1. A modularized carriage for a contact image sensor module (CIS module) comprising:

carrying means adaptable for a CIS module, said carrying means having a plurality of holes at the bottom thereof; and a plurality of shock absorber struts passing through said plurality of holes for supporting said CIS module in a manner that said CIS module can contact tightly with the bottom surface side of a sheet table.

2. The modularized carriage as claimed in claim 1, wherein said plurality of shock absorber struts are made of spring steel, each having a flat end on the top, and a lower end fixed to the bottom of said carrying means.

3. The modularized carriage as claimed in claim 1, wherein said plurality of shock absorber struts comprising:

a plurality of T-shaped struts adaptable for said plurality of holes; and a plurality of springs, each circumscribing each of said plurality of T-shaped struts, and each having a top end fixed to the bottom of said carrying means, and a lower end fixed to the lower end of each of said plurality of said T-shaped struts.

4. The modularized carriage as claimed in claim 1, wherein said carriage is adaptable for a single guiding device.

5. The modularized carriage as claimed in claim 1, wherein said carriage is adaptable for a pair of parallel guiding devices.

6. A modularized carriage for a contact image sensor module (CIS module) comprising:

carrying means adaptable for a CIS module, said carrying means having a plurality of holes at the bottom thereof;

a plurality of T-shaped struts adaptable for said plurality of holes; and a plurality of springs, each circumscribing each of said plurality of T-shaped struts, and each having a top end fixed to the bottom of said carrying means, and a lower end fixed to the lower end of each of said plurality of T-shaped struts.

7. The modularized carriage as claimed in claim 6, wherein said carriage is adaptable for a single guiding device.

8. The modularized carriage as claimed in claim 6, wherein said carriage is adaptable for a pair of parallel guiding devices.

* * * * *